United States Patent [19]

Helbig et al.

[11] Patent Number: 4,789,920

[45] Date of Patent: Dec. 6, 1988

[54] LAMP AND BASE ASSEMBLY, PARTICULARLY FOR ASSOCIATION WITH AN AUTOMOTIVE HEAD LAMP REFLECTOR

[75] Inventors: Peter Helbig, Sontheim; Walter Schönherr, Giengen, both of Fed. Rep. of Germany

[73] Assignee: Patent-Treuhand Gesellschaft für Elektrische Glühlampen m.b.H., Munich, Fed. Rep. of Germany

[21] Appl. No.: 54,536

[22] Filed: May 27, 1987

[30] Foreign Application Priority Data

Jun. 13, 1986 [DE] Fed. Rep. of Germany ... 8615923[U]

[51] Int. Cl.$^4$ ................................ B60Q 1/04

[52] U.S. Cl. ................................ 362/61; 362/267; 362/378; 362/433; 362/434

[58] Field of Search ................ 362/61, 382, 457, 226, 362/80, 82, 83, 267, 378, 433, 434, 435, 437

[56] References Cited

U.S. PATENT DOCUMENTS

| | | | |
|---|---|---|---|
| 4,528,619 | 7/1985 | Dolan et al. | 362/226 |
| 4,590,542 | 5/1986 | Schauwecker et al. | 362/226 |
| 4,609,977 | 9/1986 | Eckhardt et al. | 362/267 |

FOREIGN PATENT DOCUMENTS

| | | | |
|---|---|---|---|
| 1622032 | 10/1970 | Fed. Rep. of Germany | 362/382 |
| 8522797 | 12/1985 | Fed. Rep. of Germany . | |

*Primary Examiner*—Ira S. Lazarus
*Assistant Examiner*—Sue Hagarman
*Attorney, Agent, or Firm*—Frishauf, Holtz, Goodman & Woodward

[57] ABSTRACT

To permit use of materials having different melting temperatures and still provide a two-component base for a lamp operating at high temperature, for example a halogen incandescent lamp, the base includes a base cup (5) of high heat-resistant plastic material, connected to an attachment element (13) by interengaging snap-in spring fingers (15) and recesses (9,10). To prevent separation of the attachment element from the base cup, the spring fingers are located inside of a solid wall portion of the attachment element and the base cup is formed with projections (8, 11) for example a circumferential flange or bead, extending over the spring fingers when they are snapped into matching recesses formed in the base cup so that, after assembly, the connection cannot be loosened, either inadvertently or deliberately.

20 Claims, 2 Drawing Sheets

LAMP AND BASE ASSEMBLY, PARTICULARLY FOR ASSOCIATION WITH AN AUTOMOTIVE HEAD LAMP REFLECTOR

Reference to related patent, the disclosure of which is hereby incorporated by reference, assigned to the assignee of the present invention: U.S. Pat. No. 4,609,977, Eckhardt, Helbig and Schönherr. Reference to related publication: German Utility Model DE-GM No. 85 22 797.

The present invention relates to a lamp and lamp base assembly or combination, particularly suited for association with an automotive head lamp reflector, in which the lamp base is a multi-component element which can be readily assembled to the lamp bulb itself while providing for an oriented position of the filament in the lamp bulb with respect to the base construction.

BACKGROUND

It has previously been proposed to provide lamps for automotive vehicles, associated, for example, with a reflector. Modern lamps, such as halogen incandescent lamps, discharge lamps and the like, operate at temperatures which place a severe thermal strain on the base. U.S. Pat. No. 4,609,977, of which the co-inventors hereof are also co-inventors, as well as German Utility Model No. 85 22 797, describes a lamp-base assembly, for combination with a reflector, in which a two-component base is used to receive a metallic sleeve in which the lamp bulb itself is retained. In a preferred embodiment, the base and a connecting portion are made of plastic material which, after assembly, are welded together for example by ultrasonic plastic welding, to form an essentially inseparable unit.

Use of ultrasonic heating to connect base elements requires additional working steps which, further, use energy due to the welding processes used. The thermal loading of the lamp requires, however, an arrangement in which the portion or part closest to the lamp uses a plastic material which is highly heat-resistant, whereas the component remote from the lamp bulb can use a cheaper and less heat-resistant plastic. Forming a junction by ultrasonic heating of the high heat-resistant and the lower heat-resistant plastic is difficult.

The quality of such a junction is impaired by the differences in melting temperatures of the different plastic materials.

THE INVENTION

It is an object to improve a lamp and lamp base assembly or combination which is suitable for use with lamps operating at high temperatures—much higher than ordinary incandescent lamps—and in which a simple, yet essentially inseparable connection between base elements can be effected.

Briefly, the connection of the two base elements, for example of different materials, is done purely mechanically and is so arranged that a snap-in connection is provided in which the snap components, however, are shielded or shrouded or covered so that, once engaged and snapped together, the snap-in connection will no longer be externally accessible so that the parts or elements can no longer be separated either inadvertently by engagement with foreign elements or bodies, or due to unauthorized handling.

The arrangement has the additional advantage that no external energy is required to effect the connection.

This is particularly important when materials of different heat resistance are to be connected together since plastics or other materials having different heat-resistance and melting characteristics can be joined to form a reliable, essentially inseparable connection between the parts of the base.

DRAWINGS

DETAILED DESCRIPTION

The invention will be explained in connection with a halogen incandescent lamp, typically rated at 12 V, for use in a head light of an automotive vehicle, to be combined with a reflector shown schematically only at R in FIG. 1. The invention is, however, applicable to all types of lamps, and is particularly suitable for use with lamps in which the bulb reaches a high temperature.

Figure 1:
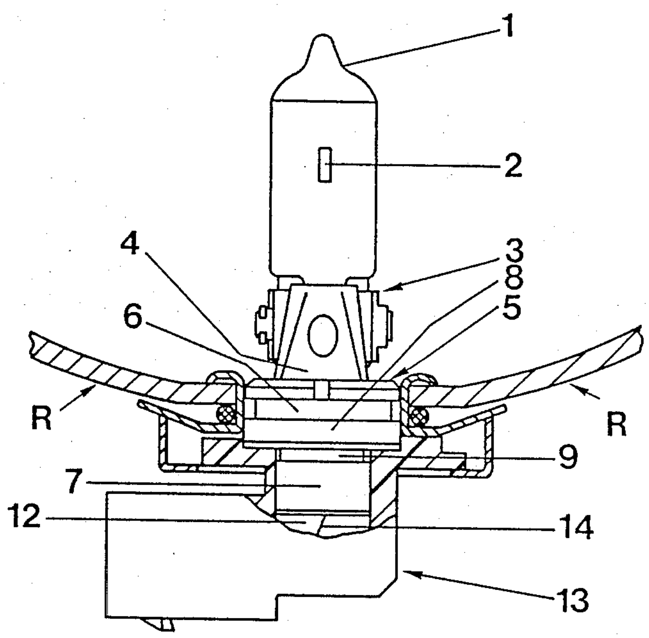
FIG. 1 is a part-sectional side view of one embodiment of a lamp with a base in combination in accordance with the present invention.

A lamp bulb 1—see FIG. 1—retains therein one or two filaments 2, in accordance with standard automotive head lamp construction. The current supply leads are not visible in the drawing; they are carried out of the lamp press or pinch seal in well known manner. The lamp, as shown in FIG. 1, is a halogen-type incandescent lamp in which a halogen additive is contained in the lamp fill which, additionally, includes an inert gas; if the lamp would be a single-ended discharge lamp, the fill would contain a metal halide.

The pinch or press seal of the lamp bulb 1—not visible in FIG. 1—is surrounded by a metal holder 3, in general of sleeve shape, which is formed with projecting leg portions 4. The projecting leg portions 4 are coupled to a two-component base and, specifically, to a cup-shaped base sleeve 5. To position the filament of the lamp or the arc of a high-pressure discharge lamp accurately with respect to the reflector R, the lamp is energized and, after placement in the metal holder, the lamp bulb is adjusted with respect to the cup-shaped base sleeve 5. Adjustment may be obtained by shifting the axial position of the lamp bulb, rotating or tilting the lamp bulb, so that the projected image of the light source will be accurately aligned with respect to the base sleeve 5. This positioning—well known by itself—can be done automatically. When the light source, for example the image of a discharge arc or of the filament, is accurately positioned with respect to the base cup 5, high frequency is applied to the base cup 5 to melt the base cup 5 to or about the metal holder 3. The base cup 5 is, essentially, pot-shaped, with the open end facing the bulb 1—see also U.S. Pat. No. 4,609,977 and German Utility Model DE-GM No. 85 22 797. In operation of a halogen incandescent lamp, temperatures of up to 240° C. may readily arise, and be transferred to the base; thus, the material of the base cup 5 should be a highly heat-resistant material such as, for example, a polyphenylene sulfide, reinforced with glass fibers and mineral filler substances.

Figure 2:
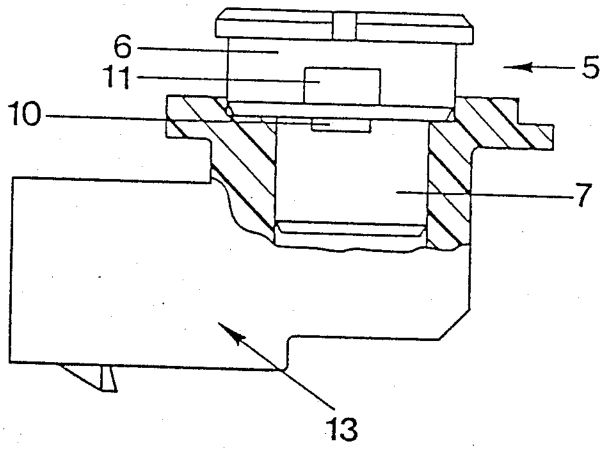
FIG. 2 illustrates another embodiment of a base, in side view, and partly in section.

The base cup 5 has a hollow cylindrical portion 6 adjacent the lamp which merges with a retaining portion 7. Retaining portion 7 has an approximately rectangular base surface. An external bead 8 is formed on the base cup 5 in the region of the transition between the hollow cylindrical portion 6 and the retaining portion 7. A circumferential groove 9 is formed at the outer wall of the retaining portion 7 beneath the bead 8, at the side remote from the bulb 1. The groove 9—see FIG. 1—may be replaced by two or more recesses 10 (see FIG. 2) located along the circumference of the outer wall of the retaining portion 7. For example, diametrically oppositely positioned recesses or notches 10 may be formed at the outer wall of the retaining portion 7; only one such recess or notch 10 is visible in FIG. 2. Rather than forming a circumferential bead 8 on the base cup 5, projecting flange portions 11 can be placed in the region of the transition between the cylindrical portion 6 and the retaining portion 7, located above the respective notches or recesses 10, and directly thereover, as seen in FIG. 2. Only one of these projections 11 is visible in FIG. 2.

The retaining portion 7 which has an essentially rectangular base surface is fitted into an attachment element 13. Attachment element 13 is formed with a reception opening or reception portion 12 to receive the retaining portion 7 of the base cup 5. The attachment element 13 is formed as a right-angle structure, the shape of which is shown and described in the referenced U.S. Pat. No. 4,609,977, specifically in FIG. 4; of course, it may have another shape, such as shown, for example in FIG. 1 of the referenced U.S. Pat. No. 4,609,977. The attachment element 13 retains the base terminals—not visible in the drawings—which are connected to current supply leads 14 (FIG. 1). The attachment element 13, preferably, is made of plastic of the ultramide type. This plastic is inexpensive and sturdy; however, it is not as heat-resistant as the polyphenylene sulfide used for the base cup 5. The arrangement has the advantage that it is easy to assemble the lamp terminals and lamp lead-in wires together if the base is a two-part structure and, by use of ultramide, the cost of the base can be lowered since this is a substantially less expensive material than polyphenylene sulfide.

Figure 3:
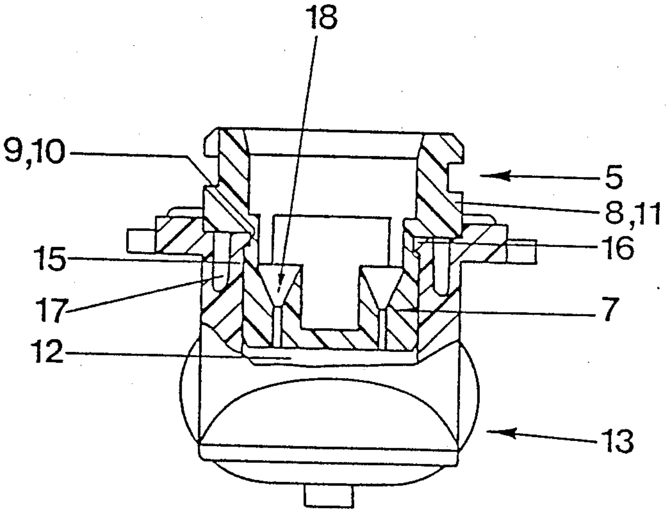
FIG. 3 is a side view of the base alone, rotated 90° with respect to FIG. 1 or 2, and shown partly in section.

FIG. 3 which illustrates the base shown in FIG. 1 or 2 rotated 90°, shows the holding arrangement of the attachment element 13 to the base cup 5. The inner walls (thickness 3 mm) of the reception opening 12 are formed with spring tongues 15 (thickness 1 mm), as integral portions of the wall, located at for example opposite positions. The free ends of the spring tongues 15 are formed with barbs 16 which extend inwardly (for about 0.5 mm) into the reception opening 12. Material is removed from the region of the walls of the attachment element 13 behind the spring tongues 15 to form a recess 17, see FIG. 3.

Assembly: The retention region 7 of the base cup 5 is inserted in the reception opening 12 of the attachment element 13. The spring tongues 15 are thereby deflected outwardly into the recess 17 of the wall of the reception opening 12 and, eventually, the barbs 16 will engage in the groove 9 (FIG. 1) or in the notches 10 (FIG. 2)—in dependence on which embodiment is used for the base cup 5. This securely locates the base cup 5 in the attachment element 13. Fortuitous removal or unauthorized removal is not possible, however, since the bead 8 or the flange portions 11 on the base cup 5 cover the spring tongues 15 from the top and, additionally, access to the spring tongues 15 from the outside of the attachment element 13 is prevented by the outer wall portion of the attachment element 13 beyond the recess 17. Thus, the spring tongues 15 are integrated into the attachment element 13 without access from the outside. The axial strength of the connection is determined by the shear surface of the barb 16 on the spring tongues 15. This axial strength, in a suitable embodiment and using ultramide as the material for the attachment element can readily be 200N. The wall thickness of the reception element 12 in the region of the tongue 15 is, of course, reduced by the thickness of the tongues 15 and by the recess 17.

The bottom of the retaining portion 7 is formed with two bores 18, which are funnel-shaped to facilitate threading of the current supply leads 14 from the bulb 1 through the openings 18 upon assembly of the lamp 1 into the cup-shaped base 5. The referenced U.S. Pat. No. 4,609,977 describes the assembly steps in detail.

Various changes and modifications may be made within the scope of the inventive concept.

We claim:

1. Lamp and base assembly combination, particularly for association with an automotive reflector (R), wherein the lamp comprises a bulb (1) closed off at one end by a pinch or press seal;

at least one light generating means (2) within said bulb; and wherein the base assembly comprises a base cup (5);

means (3) for securing the bulb (1) to the base cup (5) at a region thereof facing the bulb, said base cup (5) being formed with a retaining portion (7) remote from the bulb;

an attachment element (13) separate from said base cup (5) and formed with a receiving portion (12), and receiving the retaining portion (7) of the base cup in form-fitting engagement, and comprising, in accordance with the invention, resiliently interengaging projection (16)-and-recess (9, 10) means formed, on and unitary with portions of the base cup (5) and the attachment element (13) to permit resilient engagement of the projection means with the recess means;

and a flange-like cover means (8, 11) formed on one of said portions and positioned to cover the region of engagement and resilient deflection of the interengaging projection-and-recess means, and positioned to inhibit access thereto to prevent release effected by the interengaged projection-and-recess means after engagement thereof and locking of the base cup (5) to the attachment element (13) for retention in said form-fitting engagement.

2. The combination of claim 1, wherein the projection of the projection-and-recess means is formed on the receiving portion (12) of the attachment element (13) and the recess means is formed on the retaining portion (7) of the base cup (5).

3. The combination of claim 2, wherein the projection comprises at least one resiliently deflectable finger (15) formed with a barb (16).

4. The combination of claim 3, wherein the base cup (5) comprises heat-resistant plastic material, and wherein the attachment element (13) comprises a plastic material which is less heat-resistant than the material of said base cup.

5. Automotive head lamp-reflector unit comprising a reflector (R) and the lamp and base assembly combination as claimed in claim 2.

6. Automotive head lamp-reflector unit as claimed in claim 5, wherein the projection comprises at least one resiliently deflectable finger (15) formed with a barb (16).

7. The combination of claim 1, wherein the projection comprises at least one resiliently deflectable finger (15) formed with a barb (16).

8. The combination of claim 1, wherein the recess means comprises a circumferential groove (9).

9. The combination of claim 1, wherein the projection means comprises a pair of diametrically oppositely located resilient fingers (15) engageable in the recess means (9, 10).

10. The combination of claim 1, wherein the flange-like cover means comprises a circumferential bead (8) extending around the base cup (5).

11. The combination of claim 1, wherein the projection means comprises a pair of diametrically oppositely located resilient fingers (15) engageable in the recess means;

wherein the recess means comprises diametrically oppositely located recesses or notches (10) for reception of the fingers (15);

and wherein the cover means (11) comprises cover elements projecting with clearance over said fingers when engaged in said recesses or notches to permit engagement of said fingers in said recesses or notches while preventing access to said fingers after engagement thereof in said recesses or notches.

12. The combination of claim 1, wherein the attachment element, in the region of the receiving portion (12) comprises a circumferential solid outer wall;

the projection means comprise spring fingers (16) located inwardly of the solid outer wall, and radially outwardly deflectable;

and wherein the recess means comprises radially extending recesses (9, 10) formed in the base cup and positioned at least opposite said spring fingers to receive said spring fingers;

and the flange-like cover means is formed on the base cup (5) and comprises projecting regions extending at least in part over the solid outer wall of the attachment element to inhibit access to the spring fingers after engagement of the spring fingers in the respective recesses.

13. The combination of claim 12, wherein the base cup comprises heat-resistant plastic.

14. The combination of claim 12, further including extending barbs (16) formed on the spring fingers (15) and engageable with the respective recesses (9, 10).

15. The combination of claim 1, wherein the base cup (5) comprises heat-resistant plastic.

16. The combination of claim 1, wherein the attachment element (13) comprises plastic.

17. The combination of claim 1, wherein the means (3) for securing the bul to the base cup is a metallic holder.

18. Automotive head lamp-reflector unit comprising a reflector (R) and the lamp and base assembly combination as claimed in claim 1.

19. The combination of claim 1, wherein the base cup (5) comprises heat-resistant plastic material, and wherein the attachment element (13) comprises a plastic material which is less heat-resistant than the material of said base cup.

20. The combination of claim 1, wherein the projection means comprises a pair of diametrically oppositely located resilient fingers (15) engageable in the recess means;

wherein the recess means comprises a circumferential groove (9) for reception of the fingers (15);

and wherein the cover means (11) comprises a cover flange located radially outwardly with respect to said fingers to prevent access to said fingers after engagement of said fingers in said circumferential groove.

* * * * *